United States Patent [19]

Garton et al.

[11] 4,039,071
[45] Aug. 2, 1977

[54] APPARATUS FOR DIVIDING A CONTINUOUS STREAM OF ARTICLES INTO BATCHES WHICH MAY BE PLACED IN CONTAINERS

[75] Inventors: William Robert Garton; Peter Alec Clarke, both of London, England

[73] Assignee: Molins Limited, England

[21] Appl. No.: 586,862

[22] Filed: June 16, 1975

Related U.S. Application Data

[63] Continuation of Ser. No. 380,219, July 18, 1973.

[30] Foreign Application Priority Data

July 21, 1972 United Kingdom ............... 34123/72

[51] Int. Cl.² .......................................... B65G 47/26
[52] U.S. Cl. ................................... 198/425; 198/688
[58] Field of Search ............... 198/57, 58, 34, 35, 198/170, 172, 173, 425, 688, 697, 698; 214/16.4 C

[56] References Cited

U.S. PATENT DOCUMENTS

| | | | |
|---|---|---|---|
| 1,649,639 | 11/1927 | Wright | 198/20 X |
| 2,376,651 | 5/1945 | Bardet | 198/58 UX |
| 2,888,125 | 5/1959 | Engelson et al. | 198/34 X |
| 3,155,221 | 11/1964 | Griner | 198/34 |
| 3,190,434 | 6/1965 | Dardaine | 198/34 |
| 3,236,162 | 2/1966 | Reist | 198/34 X |
| 3,249,206 | 5/1966 | Mumma | 198/170 |
| 3,333,676 | 8/1967 | Sherman | 198/34 |
| 3,620,349 | 11/1971 | McCombie | 198/35 X |
| 3,851,748 | 12/1974 | Garton | 198/34 |
| 3,967,740 | 7/1976 | Molins | 214/16.4 C |

FOREIGN PATENT DOCUMENTS

| | | | |
|---|---|---|---|
| 1,404,141 | 7/1972 | United Kingdom | 214/16.4 C |

*Primary Examiner*—Evon C. Blunk
*Assistant Examiner*—Richard K. Thomson
*Attorney, Agent, or Firm*—Craig & Antonelli

[57] ABSTRACT

The leading end portion of a stream of cigarettes being fed horizontally by a continuous conveyor, formed of a plurality of slats, is separated from the stream by divider plates carried at intervals along the conveyor, the divider plates being arranged to slide through slots in the associated slats. The divider plates are mounted so that they are inserted obliquely into the stream of cigarettes and then moved to a vertical position, at which time the divider plates are protruding only partly into the stream. While moving in unison with the stream, the divider plates are then moved vertically so as to be progressively pushed through the remaining part of the height of the stream.

19 Claims, 2 Drawing Figures

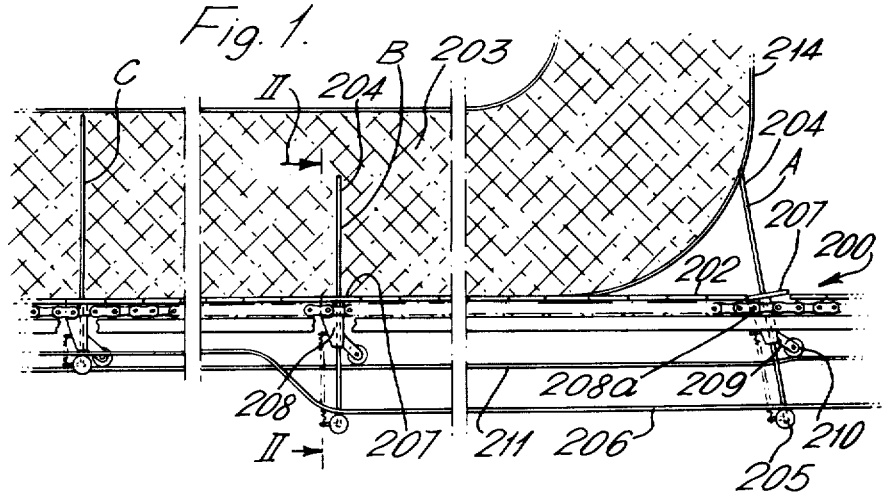
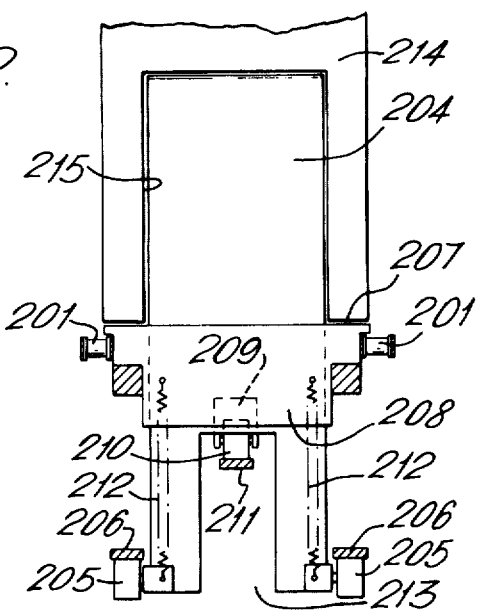

APPARATUS FOR DIVIDING A CONTINUOUS STREAM OF ARTICLES INTO BATCHES WHICH MAY BE PLACED IN CONTAINERS

This is a continuation of application Ser. No. 380,219, filed July 18, 1973.

This invention concerns improvements in or relating to apparatus for dividing a continuous stream of articles into batches which may be placed in containers.

Apparatus embodying the present invention may be employed in article handling apparatus as disclosed in copending application Ser. No. 276,362 dated 31st July 1972.

According to the present invention there is provided apparatus for separating a leading end portion of a stream of articles from said stream comprising means to feed said stream of articles along a defined path, separating means associated with said feed means and adapted to be inserted obliquely into said stream of articles and means to change the angular attitude of said separating means so that it effects separation of said leading end portion substantially transversely of said stream.

A preferred embodiment of the invention will now be described, by way of example only, with reference to the accompanying drawings in which:

FIG. 1 is a front view of apparatus for dividing a stream of cigarettes into batches, and, FIG. 2 is a section on the line II—II of FIG. 1, drawn to a larger scale.

An endless conveyor 200 consists of a pair of chains 201 which support a plurality of slats 202 which together form a surface for carrying a stream of cigarettes 203. The conveyor is provided with divider plates 204 which are operated so that they divide the stream 203 into batches, as will be described later. Each divider plate 204 is provided at its lower end (as viewed in FIG. 1) with a pair of cam followers 205 which run along fixed guides 206.

The slats 202 are fixed to the chains 201 and are plain; special slats 207 are provided at positions where a divider plate 207 is fitted, each slot 207 being formed with an extension 208. Each slat 207 is also formed with a slot, which extends through the extension 208, and through which the corresponding plate 204 can slide.

The extensions 208 are pivotally connected to the chains 201, at 208a, and are each provided with a bracket 209 which carries a cam follower 210, the latter running along a further fixed guide 211. The cam followers 205 are kept in contact with the guides 206 by springs 212, and each cam follower 210 is kept in contact with guide 211 by a spring (not shown).

With this arrangement the distance by which the divider plates extend above (as viewed in FIG. 1) the corresponding slat 207 is controlled by the guides 206, and the angular attitude of the divider plates 204 is controlled by the guide 211.

The guide 211 is positioned between the guides 206, but in a different plane, so each divider plate 204 is cut away at 213 so that they may be moved along by the chains 201 without fouling the guide 211.

In operation, cigarettes are fed downwardly on to the conveyor 200, to form the stream 203, a curved guide 214 being provided to guide the cigarettes from a vertical path to the horizontal path along which the stream 203 is fed by the conveyor 200. The curved guide 214 is cut away at 215 (FIG. 2) so that the divider plates 204, may be projected into the cigarettes as they pass around the curve on to the conveyor 200.

The divider plates 204 are moved to the left (as viewed in FIG. 1) by the chains 201, the guides 206, 211 being so arranged that each plate 204 is tilted (as shown at A in FIG. 1) as it approaches the cigarettes moving round the curved guide 214. On continued movement of the chains 201 the tip of a divider plate 204 enters the mass of cigarettes, and at this time the plate 204 is caused to move about the pivot 208a by the guide 211 until it assumes a vertical position; this movement taking place whilst the plate 204 is still being moved to the left. The plate 204 is inserted at an angle into the mass of cigarettes and then moved to the vertical position so as to create minimum disturbance of the cigarettes.

The arrangement is such that after the plate 204 assumes the vertical position, and has reached the point where the cigarettes are being fed horizontally as the stream 203, the plate 204 will be protruding into the stream 203 by approximately two-thirds of the height of the stream. When the plate 204 reaches the position shown at B in FIG. 1 it is given an upward component of movement by the guides 206 so that it is progressively pushed through the remaining part of the height of the stream 203. A plate 204, is shown, having reached this position, at C in FIG. 1. The divider plates 204 could, of course, be progressively pushed through the final part of the height of the stream by any apparatus adapted to move the divider plates vertically.

We claim:

1. Apparatus for separating a leading end portion of a stream of rod-like articles, said stream consisting of a stack of said articles moving transverse to their lengths, comprising means to feed said stream of articles along a first path, said feed means including an endless conveyor comprising a pair of chains supporting a plurality of slats defining a flat surface on which said stream of articles may be supported, spaced slats of said conveyor being provided with extensions on the surface opposed to said flat surface, said extensions being pivotally connected to said chains and having slots formed therein which extend through the respective slats; separating means comprising divider plates associated with said endless conveyor to be projected into said stream; guide means for guiding movement of said divider plates along a second path which converges on said first path, said divider plates being in sliding engagement with said slots formed in said spaced slats and their respective extensions, so that said pivotally connected extensions form part of said guide means and allow some angular movement of said divider plates relative to said second path; and inclination adjusting means for inclining said divider plates relative to said second path whereby as said paths converge each divider plate is inserted into said stream while inclined to said second path and for changing the inclination of the divider plate so that it is substantially normal to said first and second paths after said paths have converged.

2. Apparatus as defined in claim 1 in which said guide means includes a first fixed cam track engaged by cam followers rotatably mounted on said divider plates, wherein said first cam track is so shaped so as to cause said divider plates to slide longitudinally through said slots in said extensions and their respective slots and move substantially transversely of said stream.

3 Apparatus as claimed in claim 2 in which said inclination adjusting means includes a second fixed cam track engaged by further cam followers rotatably mounted on said extensions, said second cam track being so shaped that said extensions are initially oriented to cause said divider plates to be inserted into said stream of articles obliquely thereto and thereafter change their inclination by rotating said extensions about said pivotal connections.

4. Apparatus for separting a leading end portion of a stream of rod-like articles, said stream consisting of a stack of said articles moving transverse to their lengths, comprising an endless conveyor having at least one straight run; means defining a path for feeding said stream onto said straight run of said conveyor, said path having a downwardly extending portion which converges towards said run from above; at least one divider plate to be inserted in said stream, said divider plate projecting through said conveyor so as to enter progressively into said downwardly extending portion of said path as said path and said run converge, and means for additionally moving said divider plate transversely of said conveyor through said stream after said stream has been fed onto said conveyor.

5. Apparatus as claimed in claim 4 wherein the means for additionally moving the divider plate transversely includes a fixed cam track adjacent said conveyor, said divider plate being provided with rotatably mounted cam followers engaged with said cam track, said track being arranged to cause said divider plate to slide longitudinally through said slots and move substantially transversely of said stream.

6. Apparatus as claimed in claim 4 wherein said downwardly extending portion of said path converges towards said run at an oblique angle.

7. Apparatus as claimed in claim 6 wherein said downwardly extending portion of said path is curved.

8. Apparatus as claimed in claim 6 wherein said divider plate is inclined to said run of said conveyor as said plate enters said stream, further comprising means for changing the inclination of said divider plate so that it is normal to said stream on at least part of said run of said conveyor.

9. Apparatus for separating a leading end portion of a stream of rod-like articles, said stream consisting of a stack of said articles moving transverse to their lengths, comprising means to feed said stream of articles along a first path; separating means moving with said feed means and adapted to be projected into said stream; guide means for guiding movement of said separating means along a second path which converges on said first path, said separating means being supported by said guide means so as to allow some angular movement relative to said second path; inclination adjusting means for inclining said separating means relative to said second path whereby as said paths converge said separating means is inserted into said stream while inclined to said second path and for changing the inclination of said separating means so that it is substantially normal to said first and second paths after said paths have converged; and cam means engaging said separating means for moving said separating means transversely of said guide means after said first and second paths have converged.

10. Apparatus as defined in claim 9 wherein said first and second paths are oriented such that said separating means is inserted into said stream at an oblique angle relative to said first path.

11. Apparatus as claimed in claim 9 in which the means for feeding the stream comprises an endless conveyor.

12. Apparatus as claimed in claim 11 in which said endless conveyor consists of a pair of chains which support a plurality of slats which together, along part of said endless conveyor, form a flat surface on which said stream of articles is supported.

13. Apparatus as claimed in claim 12 in which the separating means comprises divider plates moving with said endless conveyor.

14. A method of separating a leading end portion of a stream of rod-like articles, said stream consisting of a stack of said articles moving transversely to their lengths, comprising moving said stream along a first path which converges obliquely towards a substantially straight second path, moving a separating means along said second path, introducing said separating means into said stream as said first and second paths converge so that said separating means project progressively further into said stream as said paths converge, moving said stream and said separating means together after said first and second paths have converged, and subsequently, further moving said separating means transversely of said first and second paths through said stream after said paths have converged.

15. A method as claimed in claim 14, in which said first path has a curved portion which converges towards said second path.

16. Apparatus for conveying cigarettes or other rod-like articles and for forming batches of the articles, each batch consisting of a stack of the articles, the apparatus comprising a substantially horizontal conveyor, a plurality of divider plates movable with the conveyor and arranged to extend across and upwards by a predetermined amount from the conveyor at spaced position along the conveyor, and means for feeding a stream of rod-like articles, transversely to the lengths of the articles, downwards onto the conveyor at a first position to form batches of the articles on the conveyor, each batch comprising a stack of the articles bounded by two adjacent divider plates, said feeding means including guide means extending obliquely downwards towards said conveyor at said first position and converging towards the conveyor in the direction of motion of the conveyor, whereby the articles enter the spaces between successive divider plates as they pass obliquely downwards along the guide means, and cam means engaging with said divider plates for successively moving said divider plates upwards relative to said conveyor to project further than said predetermined amount into and through said stream as said conveyor carries said divider plates past a second position downstream of said first position.

17. Apparatus according to claim 16 in which said divider plates intercalate with a portion of the guide means which extends downwards substantially all the way to the upper surface of the conveyor.

18. Apparatus according to claim 17 in which said portion of the guide means comprises two laterally spaced parts, and in which the divider plates pass between the said laterally spaced parts of the guide means.

19. Apparatus according to claim 16 in which the stream of rod-like articles comprises a stack of the articles of substantially the same thickness as the batches.

* * * * *